(12) United States Patent
Brady et al.

(10) Patent No.: US 7,575,251 B2
(45) Date of Patent: *Aug. 18, 2009

(54) TRAVEL TRAILER HAVING IMPROVED TURNING RADIUS

(75) Inventors: Brian R. Brady, Elkhart, IN (US); John Mitchell Rhymer, Nappanee, IN (US); Douglas Martin Lantz, Middlebury, IN (US); Timothy Arthur Hoffman, Elkhart, IN (US); Scott James Tuttle, Elkhart, IN (US)

(73) Assignee: Heartland Recreational Vehicles, LLC, Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/834,214

(22) Filed: Aug. 6, 2007

(65) Prior Publication Data

US 2007/0267845 A1 Nov. 22, 2007

Related U.S. Application Data

(63) Continuation of application No. 11/091,070, filed on Mar. 28, 2005, now Pat. No. 7,278,650.

(60) Provisional application No. 60/557,302, filed on Mar. 29, 2004.

(51) Int. Cl.
*B62D 63/06* (2006.01)
(52) U.S. Cl. .................. 280/789; 280/441.2; 280/783; 296/168; 296/24.31
(58) Field of Classification Search .............. 280/441.2, 280/783, 789; 296/168, 24.31, 182.1, 186.1
See application file for complete search history.

(56) References Cited

U.S. PATENT DOCUMENTS

| | | | | |
|---|---|---|---|---|
| 4,767,132 A | * | 8/1988 | Avery | 280/414.1 |
| 5,988,721 A | * | 11/1999 | Stenholm | 296/24.31 |
| 6,394,533 B1 | * | 5/2002 | Ladell et al. | 296/182.1 |
| 6,447,038 B1 | * | 9/2002 | Davis et al. | 296/26.05 |
| 2002/0003341 A1 | * | 1/2002 | Hall | 280/423.1 |

FOREIGN PATENT DOCUMENTS

DE 3321306 A1 * 12/1984

(Continued)

OTHER PUBLICATIONS

Exhibit 1, Eliminator color photos, 14 pages.

(Continued)

*Primary Examiner*—Lesley D Morris
*Assistant Examiner*—Michael R Stabley
(74) *Attorney, Agent, or Firm*—Baker & Daniels LLP (57) ABSTRACT

A travel trailer configured to be coupled to and towed by a vehicle is provided. The travel trailer has a compartment that is attached to a chassis which includes a front end and a rear end. A plurality of wheels are attached to the chassis adjacent the rear end, and a hitch assembly is attached to the chassis adjacent the front end. The compartment at the front end of the chassis forms first and second corners. A recess, directed inwardly toward the interior of the compartment, is located at each corner of the compartment. Cavities formed by each recess may receive a portion of the vehicle while the vehicle is engaged in a turn.

18 Claims, 11 Drawing Sheets

FOREIGN PATENT DOCUMENTS

EP                 435759 A1 * 7/1991

OTHER PUBLICATIONS

Exhibit 2, Wheelbynet.com printout, New 2006 Forest River Eliminator w/Living Quarters Toy Haulers, Sep. 2, 2008, 2 pages.
Exhibit 3, Racingjunk.com printout, Race Ads/For Sale: 2006 32' Eliminator SS Loaded with A/C, Sep. 2, 2008, 3 pages.
Exhibit 4, Forest River, Inc. invoices for 8.5×48 Eliminator Gooseneck—Order date 2000, 3 pages.
Exhibit 5, Peter J. Leigl letter for Gerard T. Gallagher dated Jul. 11, 2005, 1 page.
Exhibit 6, Ryan M. Fountain letter to Gerard T. Gallagher dated Feb. 12, 2007, 1 page.
Exhibit 7, Ryan M. Fountain letter to Gerard T. Gallagher dated Aug. 29, 2008, 3 pages.
Exhibit 8, Ryan M. Fountain letter to Gerard T. Gallagher dated Oct. 2, 2008, 3 pages.
Exhibit 9, Forest River, Inc. Answer, Defenses, and Counterclaims, Case 3:08-cv-00490-RLM-CAN (Heartland Recreational Vehicles, LLC v. Forest River, Inc. ), filed Nov. 17, 2008.
Exhibit 10, Roadmaster full print, 1 page.
Exhibit 11, Cherokee color photo—paragraph 37 of Answer, 1 page.
Exhibit 12, Cherokee vin plate (color photo)—paragraph 38 of Answer, 1 page.
Exhibit 1, Forest River's Motion to Amend Pleading dated Jan. 12, 2009.
Exhibit 2, Forest River's Amended Answer, Defenses, and Counterclaims dated Jan. 12, 2009 (38 pgs.).
Exhibit 3, Unsigned Feb. 12, 2007 letter to G. Gallagher (Heartland's attorney) from R. Fountain (Forest River's attorney).
Exhibit 4, Unsigned Aug. 29, 2008 letter to G. Gallagher from R. Fountain.
Exhibit 5, Unsigned Oct. 2, 2008 letter to G. Gallagher from R. Fountain.
Exhibit 6, Heartland's Information Disclosure Statement Letter of Jun. 23, 2005 to the USPTO.
Exhibit 7, Heartland's Information Disclosure Statement Form of Dec. 5, 2008.
Exhibit 8, USPTO Interview Summary, Dec. 4, 2008, p. 2.
Exhibit 9, Heartland's Information Disclosure Statement Letter of Dec. 5, 2008 to USPTO.
Exhibit 10, Heartland's Remarks section of Amendment After Final of Dec. 5, 2008.
Exhibit 11, USPTO Interview Summary, p. 3.
Exhibit 12, USPTO Interview Summary, p. 4.
Declaration of Dan Yarnall, General Manager at Roadmaster, LLC, dated Feb. 11, 2009 (includes Exhibits A and B).

* cited by examiner

TRAVEL TRAILER HAVING IMPROVED TURNING RADIUS

The present application is related to and claims priority to U.S. patent application Ser. No. 11/091,070, filed Mar. 28, 2005, entitled TRAVEL TRAILER HAVING IMPROVED TURNING RADIUS, which in turn claims priority from U.S. Provisional Patent Application Ser. No. 60/557,302, filed on Mar. 29, 2004, entitled IMPROVED FIFTH WHEEL TRAILER. Both applications are hereby expressly incorporated into the present application.

BACKGROUND AND SUMMARY

The present disclosure relates generally to travel and fifth wheel-type trailers. In particular, the present disclosure is related to the configuration of such trailers that are hitched to, and pivotable relative to, an attached towing vehicle.

Travel trailers and fifth wheel trailers are commonly known and used as campers or used for hauling. Typically, fifth wheels are configured to be pivotably attached to pickup or similar type trucks. The bed of the pickup truck has a mating hitch attached thereto configured to receive a hitch located on the underside of the forward end of the fifth wheel. The fifth wheel often comprises an upper deck and a lower deck. The upper deck is typically located forward on the fifth wheel and is configured to extend over the rear of the pickup truck so the hitch can attach to the mating hitch on the truck's bed.

An issue that has arisen in recent years with fifth wheels, precipitated by the development and popularity of extended-cab pickup trucks. These extended-cab pickup trucks, which typically offer a second row of seating, extend the cab length often at the expense of the bed length. A consequence of this is that more pickup trucks now exist with shortened beds than in the past. Accordingly, the upper decks of conventional fifth wheels now occupy a greater portion of that shortened bed than in truck beds of the past. The less space that exists between the cab of a short bed truck and the forward end of the fifth wheel, the more impaired the turning radius of the truck can be.

Conventionally, the upper deck of a typical fifth wheel has a rectangular or parallelogram-shape footprint whose forward corner edges form right angles. The compartment extending upward therefrom is similarly cubicle and includes right-angled corner edges as well. These right-angled corner edges of the fifth wheel have a propensity to hit the rear corner of the cab of a tow vehicle if the turning radius of that vehicle becomes too great. As a result, the driver of the tow vehicle is required to either take broader turns or engage specialty hitches that extend the distance between the cab and the fifth wheel. These are not always desirable options because often there may not be available space to make a broad turn, and specialty hitches are cumbersome and expensive. Typically, these hitches are engaged before the turn and disengaged after the turn. It would, therefore, be beneficial to provide an alternative design of fifth wheel or travel trailer that is configured to increase the turning radius of the vehicle.

Accordingly, an illustrative embodiment of the present disclosure provides a travel trailer characterized by a chassis assembly coupled to a wheel assembly. A compartment is provided having at least one side wall and a forward wall. A hitch assembly is located adjacent the chassis assembly, and the forward wall. The hitch assembly is configured to couple to a mating hitch on a towing vehicle. The travel trailer also comprises a panel located between the side and forward walls. The panel forms an angle between itself and at least the side wall that is greater than 90 degrees.

In the above and other illustrative embodiments, the travel trailer may also comprise; the angle formed between the side wall and the panel reduces any right-angled attachment between the side and forward walls to improve the towing vehicle's turning radius relative to the travel trailer; the panel forms an angle between itself and forward wall that is greater than 90 degrees; the panel eliminates any right-angle attachment between the side and forward walls; and the chassis assembly comprises a recess at edges adjacent the panel.

Another illustrative embodiment of the travel trailer comprises a chassis, a wheel assembly, a hitch assembly, and an outer coupling rail. The chassis includes a front end and a rear end. The chassis also includes a front outer frame rail located substantially perpendicular to a side outer frame rail. The wheel assembly is coupled to the chassis adjacent the rear end. The hitch assembly is attached to the chassis adjacent the front end. The outer coupling rail extends between the front and side frame rails. The outer coupling rail forms an angle between itself and at least the side frame rail at a front edge of the travel trailer that is greater than 90 degrees.

In the above and other illustrative embodiments, the travel trailer may also comprise: the coupling rail forming an angle between itself and the front frame rail that is greater than 90 degrees to improve the towing vehicle's turning radius relative to the travel trailer; the coupling rail eliminating a right-angle attachment between the side and front frame rails; and a compartment attached to the chassis at the front edge adjacent the outer coupling rail which comprises an inwardly oriented recess that extends from the chassis.

Another illustrative embodiment of the travel trailer comprises a chassis, a forward panel, at least one side panel, and a corner panel. The chassis assembly comprises a hitch assembly adjacent a front end of the trailer and a plurality of wheels adjacent a rear end of the trailer. The forward panel is located at the front end. The corner panel joins the forward and side panels but does not form a right-angled vertex between the forward and side panels. This allows an increased turning radius for the trailer as compared to forward and the side panels that join to form a right-angled vertex.

In the above and other illustrative embodiments, the travel trailer may also comprise; the corner panel forming a recess at a front edge of the travel trailer; the chassis assembly comprising a frame assembly having a corner rail located at a front corner of the frame that does not form a right-angled vertex at the front corner of the frame; and a compartment having right and left front corners, each of which is recessed inwardly to allow an increased turning radius for the trailer as compared to front edges having a right-angled vertex.

Another illustrative embodiment of the travel trailer comprises a chassis, a compartment, and a corner panel portion. The chassis comprises a hitch assembly adjacent a front end of the trailer and a plurality of wheels adjacent a rear end of the trailer. The compartment comprises at least a forward panel portion located at the front end and at least one side panel portion. The corner panel joins the forward and the side panels and recesses inwardly toward the interior of the compartment to allow an increased turning radius for the travel trailer as compared to forward and the side panels that join to form a right-angled vertex.

Another illustrative embodiment is a travel trailer for use with a towing vehicle. The towing vehicle has a mating hitch coupled thereto and is configured to haul the travel trailer. The travel trailer further comprises a chassis and a hitch. The chassis itself comprises first and second longitudinally extending side frame members, forward and rearward cross-members, and a first brace. The first and second longitudinally extending side frame members are oriented substantially parallel to each other and located exteriorly on the chassis. The forward and rearward cross-members are oriented substantially perpendicular to the first and second side members. The forward cross-member is also located exteriorly on the chassis and whose end does not attach to a corresponding end of the first side member. The first brace is attached adjacent the ends of forward cross-member and the first side member, and is located exteriorly on the chassis, and is oriented non-parallel to both the forward cross-member and the first side member. The hitch is attached to a portion of the chassis and couples with the mating hitch on the towing vehicle.

In the above and other illustrative embodiments, the travel trailer may also comprise: the towing vehicle having a bed that has the mating hitch attached thereto, and wherein a portion of the chassis is located over the bed; a compartment attached to the chassis and at least one recessed corner edge located at a forward end of the trailer adjacent the first brace to allow an increased turning radius for the travel trailer; and a frame having angled corner edges adjacent the recesses at the front end of the compartment.

Another illustrative embodiment is a travel trailer configured to be coupled to, and towed by a vehicle. The travel trailer comprises, a compartment attached to a chassis that includes a front end and a rear end. A plurality of wheels is attached to the chassis adjacent the rear end and a hitch assembly is attached to the chassis adjacent the front end. The compartment at the front end of the chassis forms first and second corners. A recess is located at each corner edge of the compartment such that cavities formed by each recess may receive a portion of the vehicle while the vehicle is engaged in a turn.

Another illustrative embodiment is a travel trailer configured to be coupled to, and towed by a vehicle. The travel trailer comprises a compartment attached to a chassis that includes a front end and a rear end. A plurality of wheels is attached to the chassis adjacent the rear end and a coupling is attached to the chassis adjacent the front end. The front end of the chassis forms first and second corner edges that are recessed.

Another illustrative embodiment is a travel trailer configured to be coupled to, and towed by a vehicle. The travel trailer comprises a chassis assembly, a hitch, a compartment and a cap. The chassis assembly includes front and rear ends. The hitch is attached to the chassis assembly adjacent the front end. The compartment is attached to the chassis assembly. The cap is located at the front end of the chassis and attached to the compartment. The cap has at least one front corner edge that includes a recess directed inward toward the compartment.

In the above and other illustrative embodiments, the travel trailer may also comprise: the cap further comprising a second front corner edge that also includes a recess directed inward toward the compartment; the space formed by the recesses being configured to receive a portion of the vehicle when engaged in a turn; the cap being a monolithic structure; and the cap being a plurality of structures.

Additional features and advantages of the travel trailer will become apparent to those skilled in the art upon consideration of the following detailed description of the illustrated embodiment exemplifying the best mode of carrying out the travel trailer as presently perceived.

BRIEF DESCRIPTION OF THE DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the travel trailer, and such exemplification is not to be construed as limiting the scope of the travel trailer in any manner.

DETAILED DESCRIPTION OF THE DRAWINGS

Figure 1:
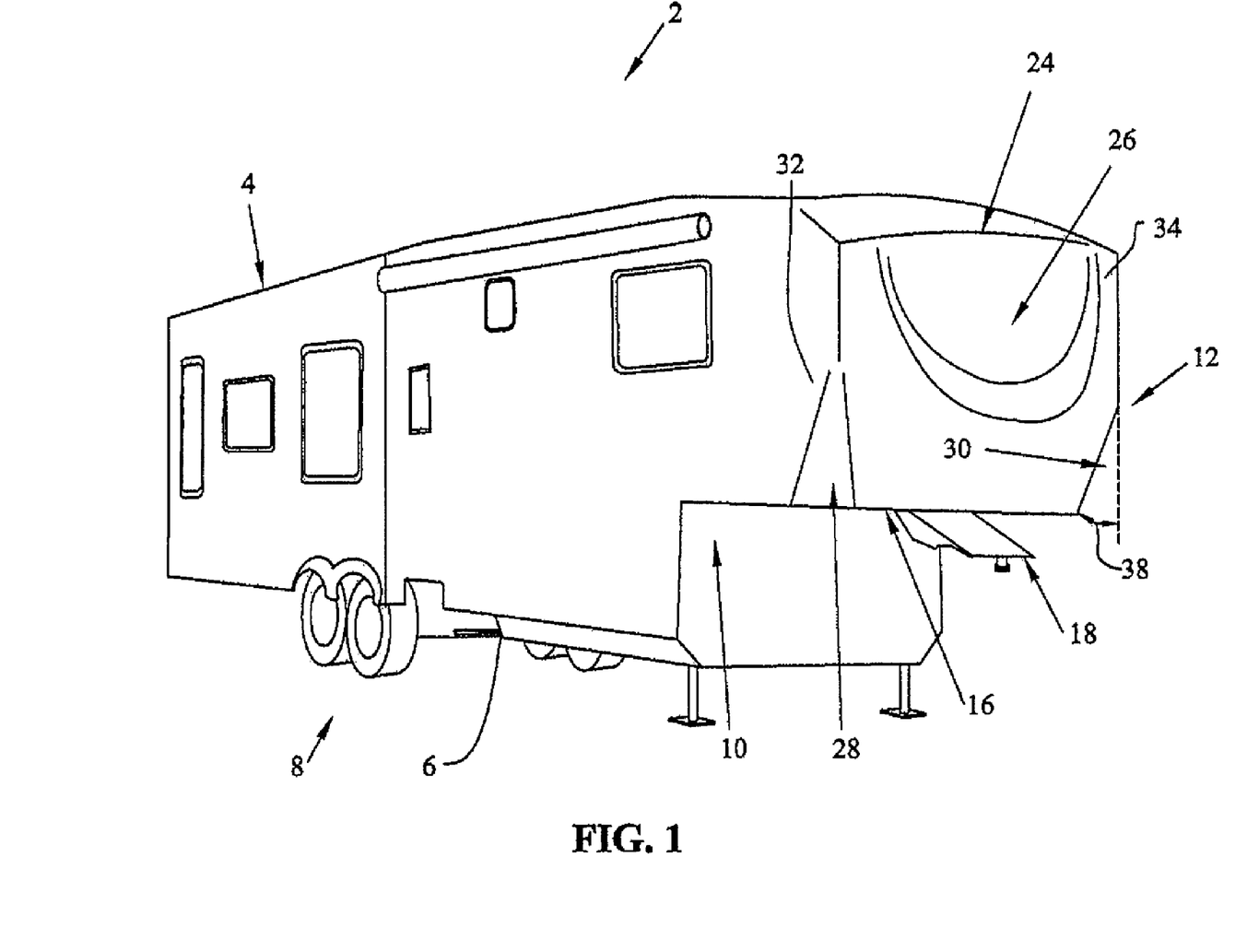
FIG. 1 is front perspective view of an illustrative trailer including recessed front corners according to an illustrative embodiment of the present disclosure.

A front perspective view of an illustrative fifth wheel or travel trailer 2 is shown in FIG. 1. The trailer shown in this view is commonly referred to as a fifth wheel trailer. This trailer 2, as well as other trailer designs, generally comprises a compartment 4 that sits on a frame chassis 6 (see, e.g., FIGS. 6 through 15) which are tied to a plurality of wheels 8. This trailer 2 includes a dual deck design having a step 10 located near the front end 12 of trailer 2. The step 10 allows the upper deck 16 of compartment 4 to extend over the bed of a tow vehicle 14 such as a pickup truck. (See also FIG. 2.) Attached to upper deck 16 of trailer 2 is a hitch assembly 18. This hitch assembly 18 is located adjacent the front end 12 of trailer 2, as well. The hitch assembly 18 is configured to engage a mating hitch assembly, typically located on bed 22 of the vehicle 14. (See, e.g., FIG. 2.)

The forward most end of the compartment comprises an illustrative forward end cap 24. In this illustrative embodiment, end cap 24 comprises a forward face 26, recessed corner edges 28, 30 and side panels 32, 34. Illustratively, the forward face 26 is bowed outwardly from compartment 4 with its apogee located near the vertical center of the same, as shown in FIG. 1. Also, as one illustrative embodiment, the recessed corner edges 28, 30 follow a similar contour as forward face panel 26. This allows a portion of the compartment to extend forward of the rear end of passenger compartment 36 of tow vehicle 14. (See, e.g., FIG. 5.) In addition, at least a portion of the front corners of the trailer 2 are occupied by the recessed corner edges 28, 30. Clearance provided by recessed corner edges 28, 30 is particularly useful for fifth wheels and other trailers that include an upper deck 16 similar to that shown herein, Since the portion of the compartment located over upper deck 16 is adjacent the rear end of passenger compartment 36 on vehicle 14, limited distance between the two structures may exist. It is this limited distance that inhibits the turning radius of the vehicle 14. As shown in FIG. 1, the space formed by the inward directed, arcuate profile corners, can receive a portion of compartment 36, thus creating enhanced turn radiuses, as compared to conventional right-angle vertex cornered edges of conventional trailers. The distinction between the two corner types is illustratively indicated by reference numeral 38. Thus, recessed corner edges 28, 30 are directed inwardly toward the interior of compartment 4, the effective turn radius available for the trailer can be enhanced over conventional fifth wheel or other travel trailers having standard 90 degree corner edges.

It is appreciated that alternative embodiments of forward end cap 24 may include any number of shapes having inward directed corners. Cap 24 may also be manufactured from a plurality of panels, or may be a monolithic molded or formed structure. Illustratively, in one embodiment, forward face 26 may comprise a separate forward panel, separate recessed, and/or even separate angled panels attached thereto, along with separate side panels attached thereto. It is further appreciated that in other illustrative embodiments, the recessed corner edges can be of varying shape, depth, contour, and angle to accommodate and increase the turning radius of the attached vehicle.

Figure 2:
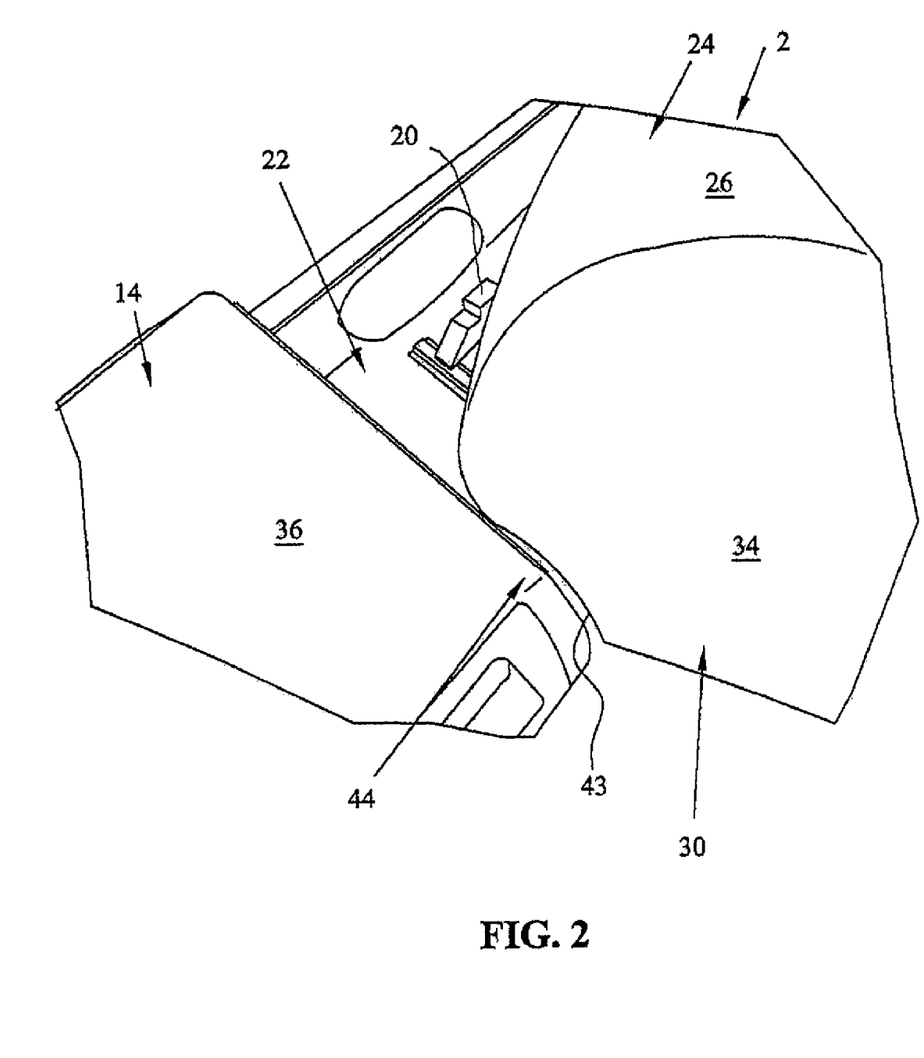
FIG. 2 is a top perspective detail view of a front corner edge portion of the trailer and a rear cab portion of a tow vehicle engaged in a turn.

A top perspective detail view of recessed corner edge 30 of trailer 2 coupled to vehicle 14 which is engaged in a turn, is shown in FIG. 2. A cavity 42 produced by the contour of recessed corner edge 30 receives at least a portion of corner 44 of vehicle 14. As shown in this view, mating hitch assembly 20 is attached to bed 22 of vehicle 14 and is engaged to hitch assembly 18 to pivotably attach trailer 2 to vehicle 14. (See, also, FIG. 3.) This view demonstrates how such a turn would not be possible without recessed corner edge 30. Sidewall 34, if extended more forwardly on trailer 2, along with front face 26 extending its width, a conventional right-angle corner edge would be formed that would become crushed during such a tight turn shown therein. From this view it is appreciated that the recessed corner edge 30 can be contoured as desired, so its cavity 43 receives a portion of the corner of the cab of the vehicle having any unique or conventional configuration. (See FIG. 3.) It is contemplated herein that the invention is not limited to the specific size, shape, and contour of the recessed portion. It can further be seen from this view how the arcuate contour of forward end cap 24 can increase the amount of available space in the compartment by being able to extend over at least a portion of passenger compartment 36 of vehicle 14. (See, also, FIG. 5.) This may be achieved either independently or in combination with recessed corner edges 28, 30.

Figure 3:
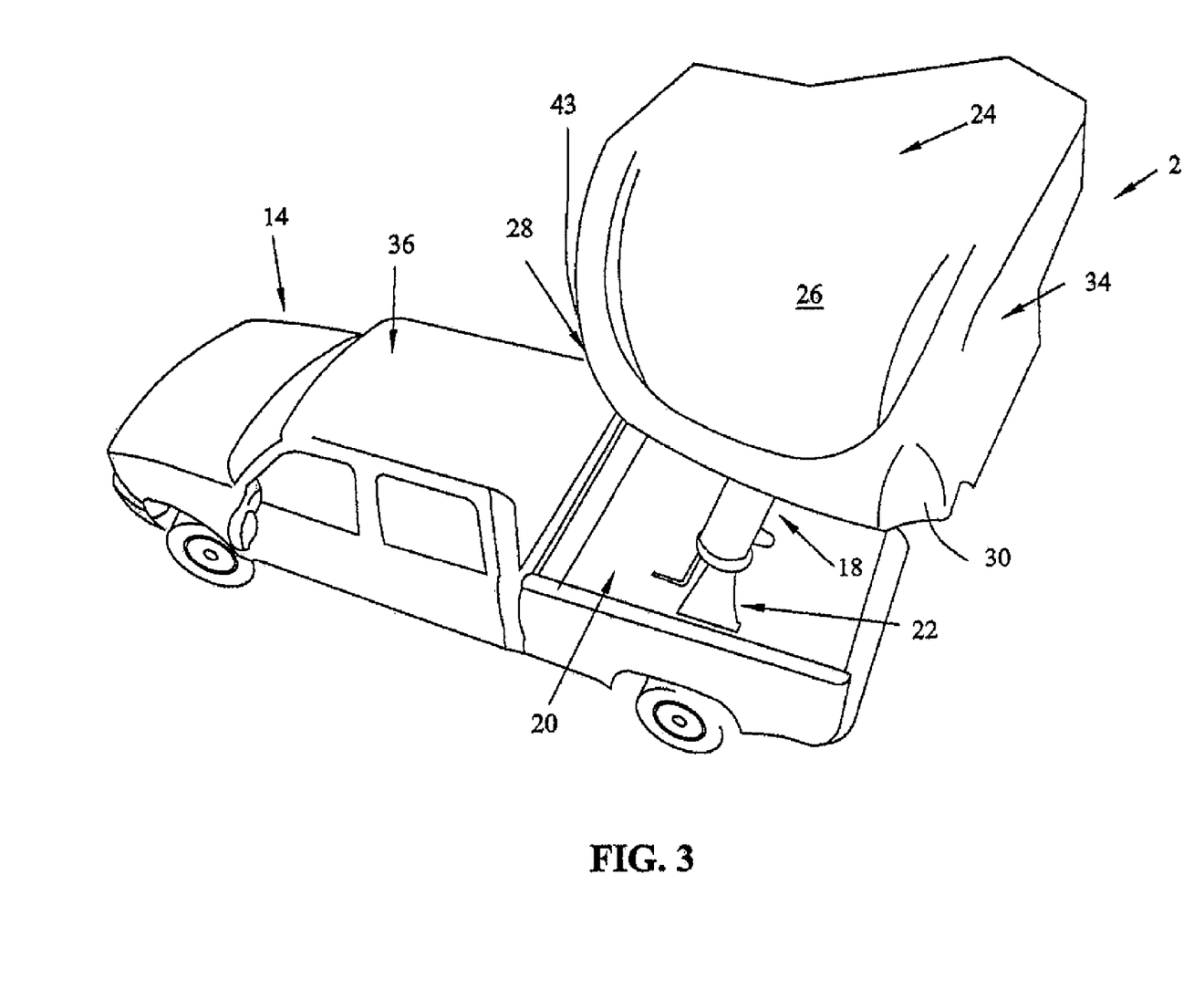
FIG. 3 is another top perspective detail view showing the other front corner edge portion of the trailer and the other rear cab portion of the tow vehicle engaged in a turn.

Another top perspective detail view showing an opposite turn of vehicle 14 with respect to trailer 2, is shown in FIG. 3. This view demonstrates how recessed corner edge 28, similar to that shown with respect to recessed corner edge 30, can increase the turn radius of vehicle 14. Such a sharp turn, as depicted in this view, could not be achieved with a trailer having conventional right-angled corner edges.

Figure 4:
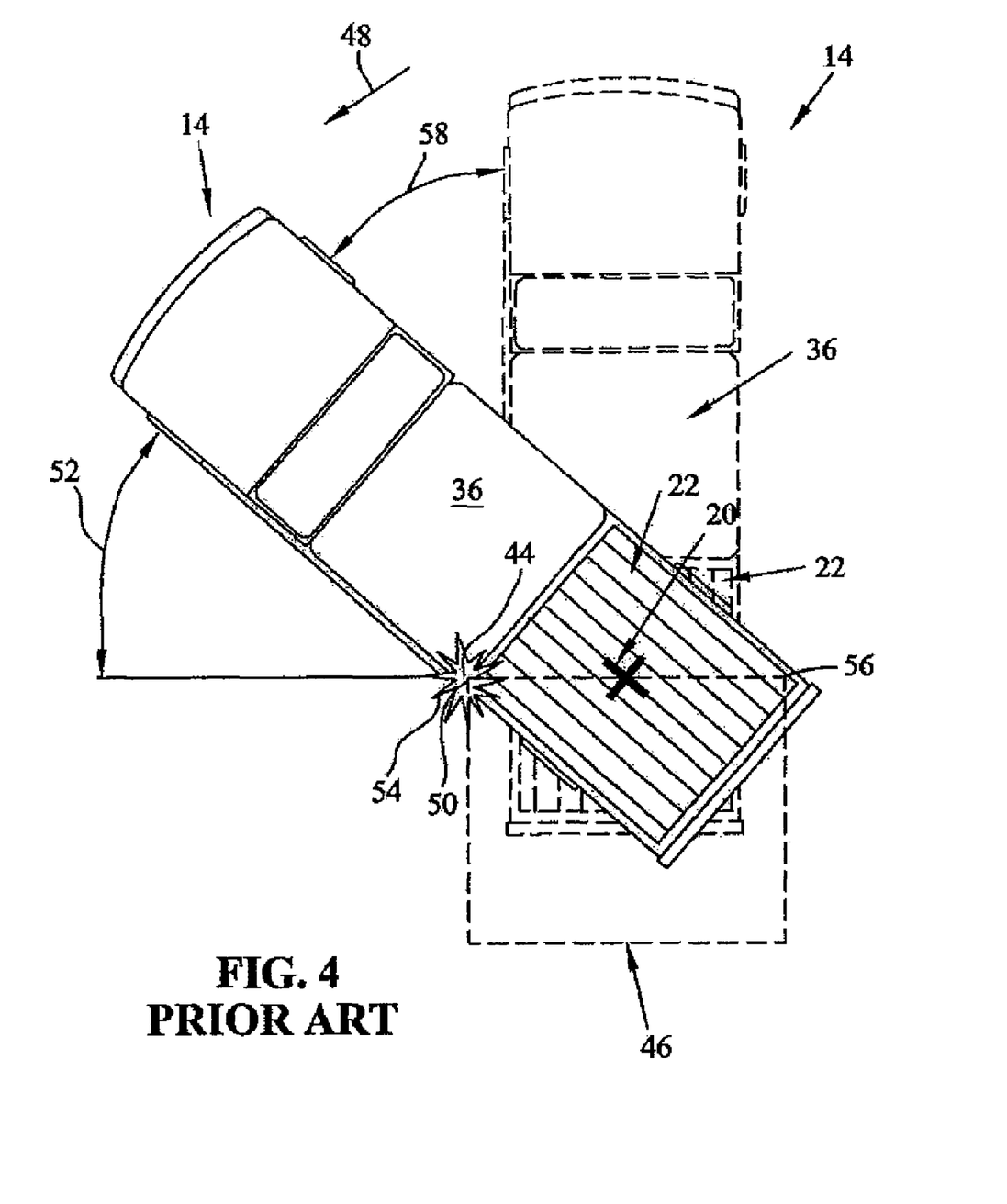
FIG. 4 is a top schematic view of an illustrative tow vehicle and a prior art trailer.

To further illustrate, a top schematic view of tow vehicle 14 hitched to a prior art, conventionally shaped trailer 46, is shown in FIG. 4. As vehicle 14 turns in direction 48, the corner 50 of prior art trailer 46 impacts rear corner 44 of passenger compartment 36 at a relatively shallow angle. This produces a relatively large crush zone as indicated by reference numeral 52 at impact 54. Because the forward corners of prior art trailer 46 include corners having right-angled edges as indicated by reference numerals 50 and 56, the turn radius is relatively small, as indicated by reference numeral 58.

Figure 5:
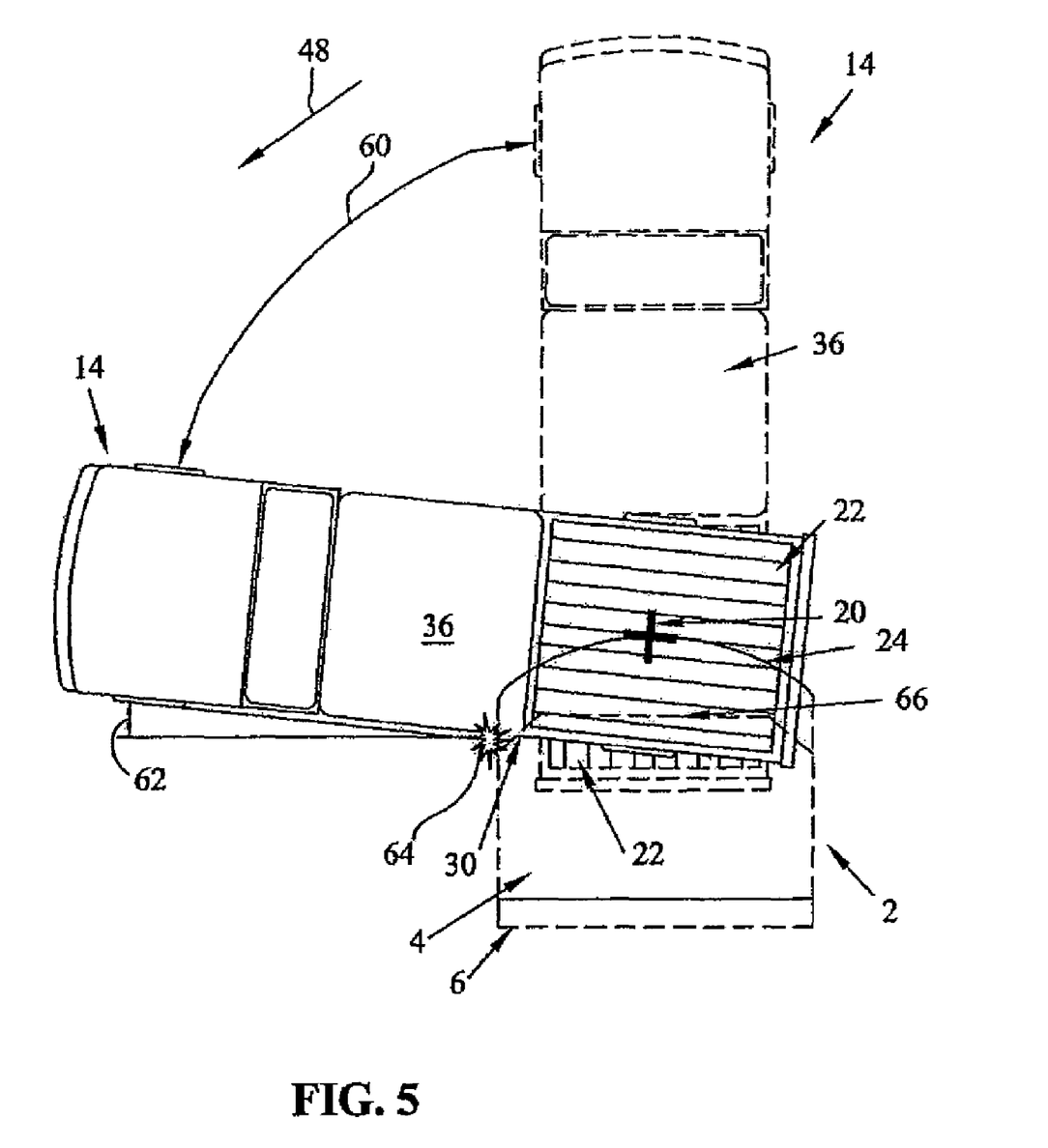
FIG. 5 is a top schematic view of the illustrative tow vehicle of FIG. 4 and a trailer according to an illustrative embodiment of the present disclosure.

In contrast, as shown in FIG. 5, the same vehicle 14 is shown making a turn with an illustrative embodiment of trailer 2 hitched thereto. As shown, when vehicle 14 turns in direction 48, the recessed corner edge 30 provides enough clearance to create a relatively large turn radius, indicated by reference numeral 60, and has a relatively small crush zone 62 at impact point 64. It is also appreciated from this view how the illustrative arcuate shape of forward end cap 24, as described with respect to FIG. 1, may enhance the available space within compartment 4. In this view it is shown that the forward edge 66 is recessed towards the interior of compartment 4 relative to the forward most point of forward end cap 24. In one illustrative embodiment this combination between the arcuate shape of forward end cap 24 and the recessed positioning of forward edge 66 of chassis 6 provides a compromise between increased interior space of compartment 4 and the enhanced turning radius as shown.

Figure 6:
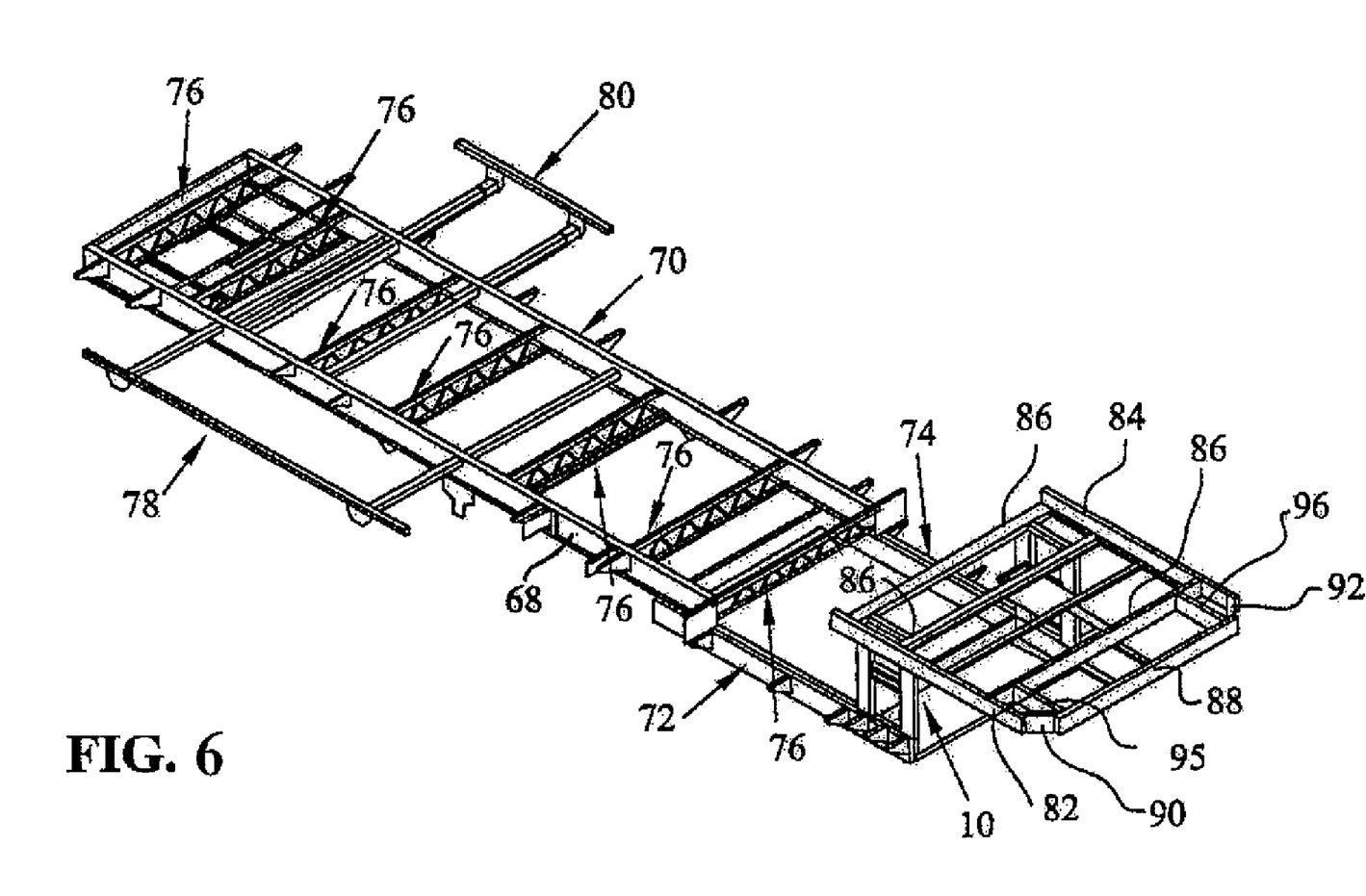
FIG. 6 is a perspective view of a trailer frame according to an illustrative embodiment of the present disclosure.

A perspective view of an illustrative embodiment of chassis 6 is shown in FIG. 6. Chassis 6 is illustratively a frame that the flooring and compartment are built upon. Such framing includes side frame members 68, 70 extending longitudinal from front to rear and are joined by additional side frame members 72, 74. In this illustrative embodiment, cross beams 76 extend between the side frame members 68 through 74. Shown in this illustrative embodiment are also slide-out frame members 78 and 80. As discussed with respect to FIG. 1, this trailer includes a step 10 that provides the upper deck 16, herein formed on the chassis by side frame members 82, 84 and structurally secured by cross beams 86. As shown herein, side frame members 82, 84 do not extend and attach directly to forward edge beam 88. Rather, angled braces 90 and 92 extend between frame members 82, 84 and forward edge beam 88 respectively, as shown herein. Angled braces 90, 92, thus, effectively eliminate the right-angled corner edges known to inhibit the turning radius of the vehicle relative to the trailer. It is contemplated that the precise angle formed between, for example, frame members 82 and angled brace 90, can be of any angle to allow a recess to form. As illustratively shown herein, the angle formed between the two structures is greater than 90 degrees. The same is illustratively the case with the angle between forward edge beam 88 and both angled braces 90, 92 as shown herein. Also shown are illustrative forward brace members 95, 96 which serve to strengthen chassis 6.

Figures 7, 8:
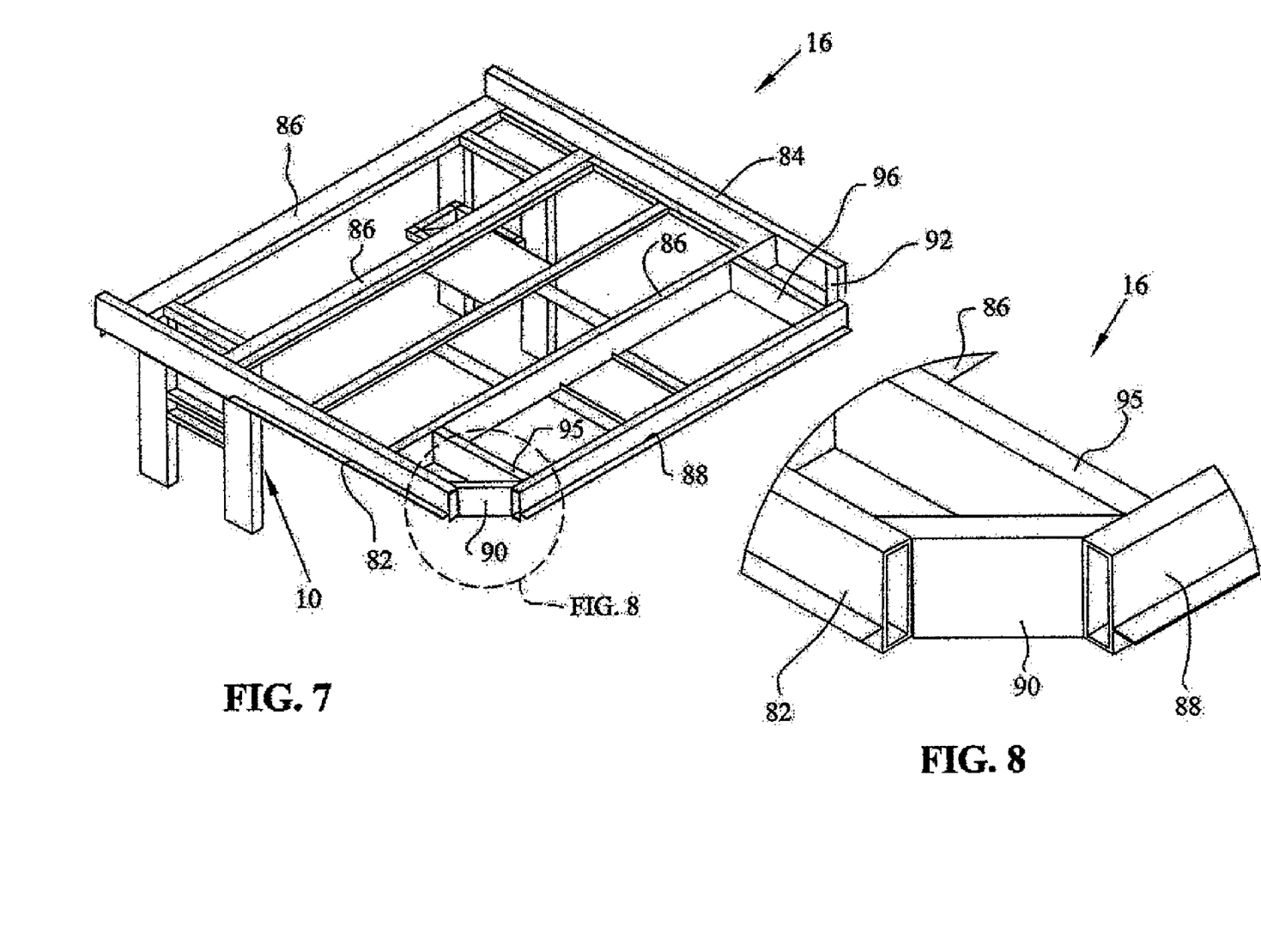
FIG. 7 is a perspective view of a portion of the trailer frame of FIG. 6.
FIG. 8 is a detail perspective view of a portion of the trailer frame about section A of FIG. 7.
Figure 9:
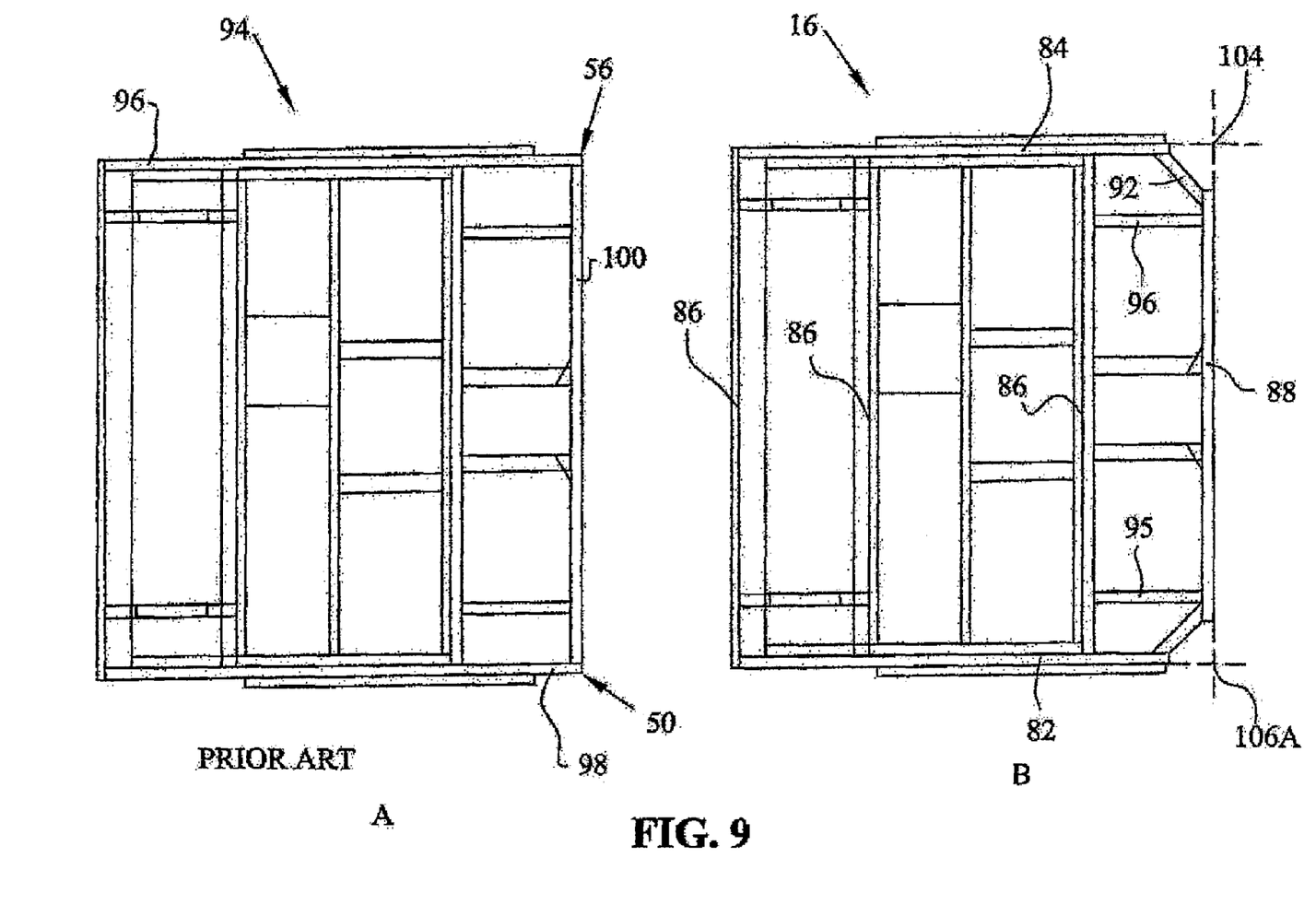
FIG. 9a is a top view of a portion of a prior art trailer frame.
FIG. 9b is a top view of a portion of the trailer frame of FIG. 6.

A perspective view of a portion of chassis 6 is shown in FIG. 7. Specifically, shown is the upper deck portion 16 which includes side frame members 82, 84, and cross beams 86.

Forward edge beam 88 is shown attached to angled braces 90, 92, which are themselves attached to side frame members 82, 84, respectively. A detail view of a forward corner of upper deck 16 is shown in FIG. 8. This view further illustrates the attachment of angled brace 90 forward edge beam 88, and side frame member 82. It can be appreciated from this view how beam 88 and side frame member 82 do not directly attach, thus eliminating the right-angle corner edge that would otherwise be formed by their attachment.

Top views of the upper deck of the travel trailer are shown in FIGS. 9a and b. Specifically, FIG. 9a is a prior art version of such an upper deck, whereas FIG. 9b depicts upper deck 16 as discussed with respect to FIGS. 6 through 8. Comparing the structure of 9a to the structure of 9b much is similar except for the forward corners and the forward edge beams. For example, the prior art upper deck 94 uses side frame members 96, 98 to attach to forward edge beam 100 to form corner right-angled edges 50, 56. (See, also, FIG. 4.) It is these corner edges that can limit the turning radius of vehicle 14 for the reasons previously discussed. By comparison, such corner edges have been removed from upper deck 16, as indicated by reference numerals 106, 104 in FIG. 9b.

Figure 10:
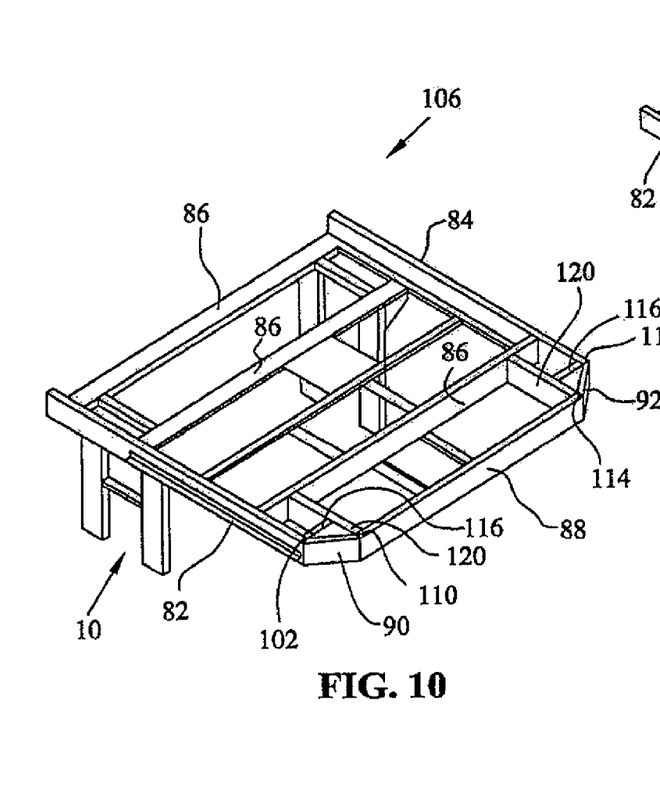
FIG. 10 is a perspective view of a portion of a trailer frame according to another illustrative embodiment of the present disclosure.
Figure 11:
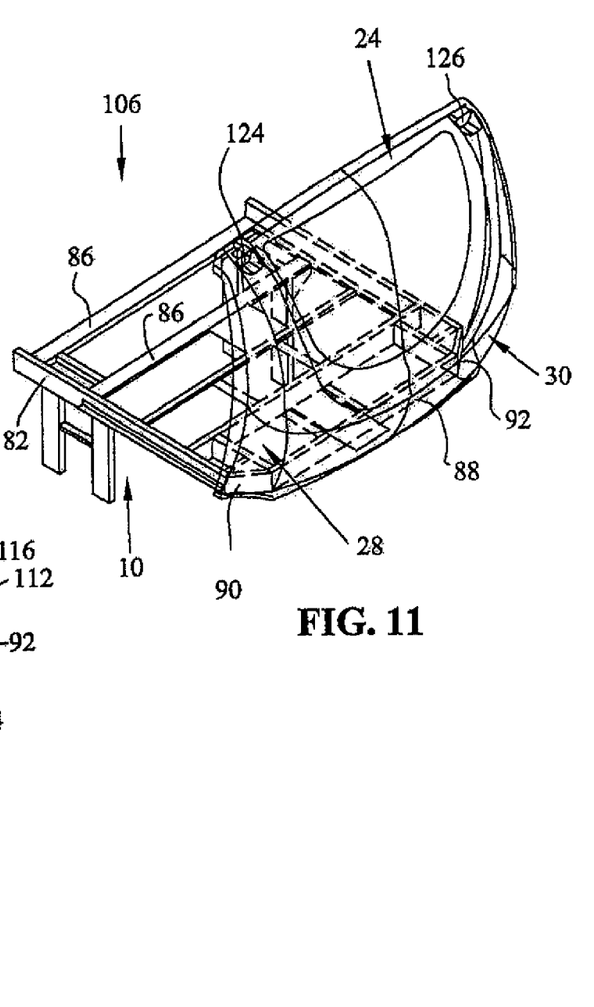
FIG. 11 is a perspective view of the portion of the frame of FIG. 10 including a front cap assembly coupled thereto.

Perspective views of another illustrative embodiment of an upper deck frame 106 are shown in FIGS. 10 and 11. As shown in FIG. 10, many of the side frame members 82, 84, as well as cross beams 86, are the same or similar to that shown in the previous embodiments. Furthermore, forward edge beam 88 is also positioned in a comparable location as prior embodiments. This illustrative embodiment differs from the prior embodiments from the perspective that angled braces 90, 92 are attached to the ends of frame members and beams 82, 88 and 84, 88, respectively. For example, angled brace 90 is attached to the terminus 108 of side frame member 82. Similarly, angled brace 90 is attached to terminus 110 of forward edge beam 88. Angled brace 92 follows suit by attaching to side frame member 84 at terminus 112 and to forward edge beam 88 at terminus 114. In this embodiment cross beams 116 and 120 illustratively provide structural support to the forward corners.

The perspective view of upper deck frame 106 in FIG. 11 shows an illustrative embodiment of forward end cap 24 attached thereto. The angled braces 90, 92 accommodate the recessed corner edges 28, 30, as previously discussed. It is appreciated that the recessed corner edges may follow the contour of braces 90, 92, or they may, as shown herein, form a differently shaped recessed cavity. Further shown in this view are illustrative attachments 124, 126 which are configured to be used to attach end cap 24 with compartment 4. It is appreciated, however, that other means of attachment and/or sealing can be employed.

Figure 12:
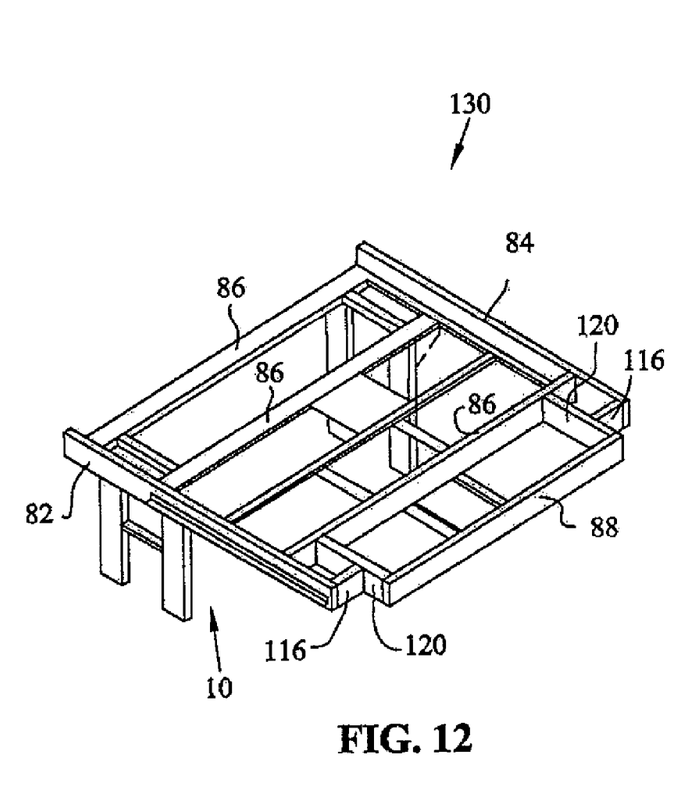
FIG. 12 is a perspective view of a portion of a trailer frame according to another illustrative embodiment of the present disclosure.
Figure 13:
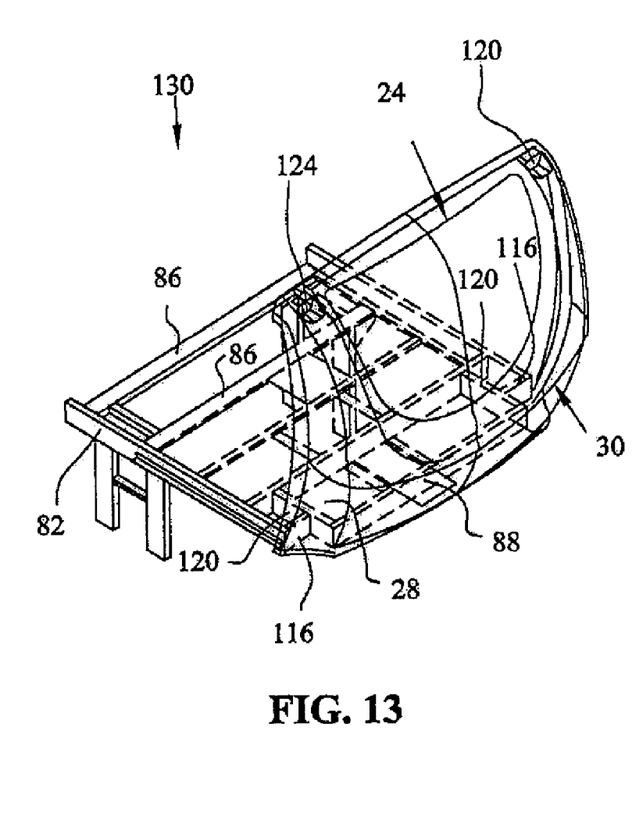
FIG. 13 is a perspective view of the portion of the frame of FIG. 12 including a front cap assembly coupled thereto.

Perspective views of another illustrative embodiment of upper deck 130 of a trailer are shown in FIGS. 12 and 13. As shown in FIG. 12, upper deck 130 is similar in several respects to the prior embodiments, including side frame members 82, 84, as well as cross beams 86 extending there across. The distinction from the previous embodiments is that angled braces 90, 92 are removed completely which illustratively provides an even deeper recess within the forward corners of the deck 130. As shown, cross beams 116, 120 serve as the outer structure of deck 130 at the forward corners. Although cross beam 116 forms a right-angle attachment with side frame member 82, and cross beam 120 does the same with forward edge beam 88, frame member 82 does not attach to forward edge beam 88 to form a right-angled corner edge as disclosed in the prior art. Rather the right angle attachments disclosed in this illustrative embodiment are directed inwardly toward the interior of compartment 4 Similar to the previous embodiments, forward end cap 24 is shown attached to upper deck 130 in FIG. 13. It is, again, appreciated that the recessed corner edges can be of any useful depth and may be formed to conform to the shape of the cavities created by cross beams 116, 120. Conversely, as shown herein, recessed corner edges 28, 30 may also take a differing recess shape than the cavities formed by cross beams 116, 120.

Figure 14:
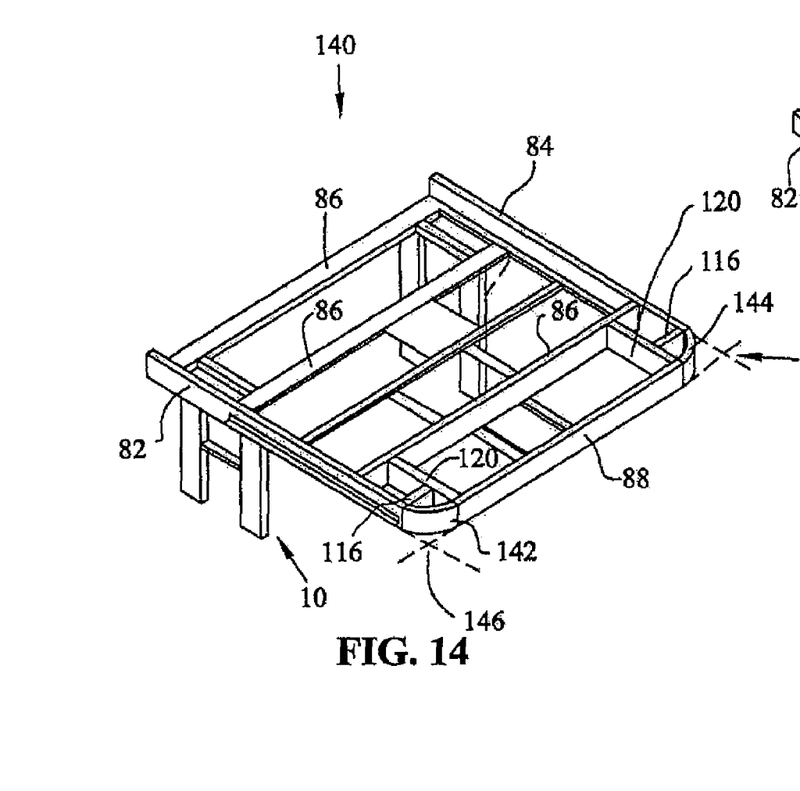
FIG. 14 is a perspective view of a portion of a trailer frame according to another illustrative embodiment of the present disclosure.
Figure 15:
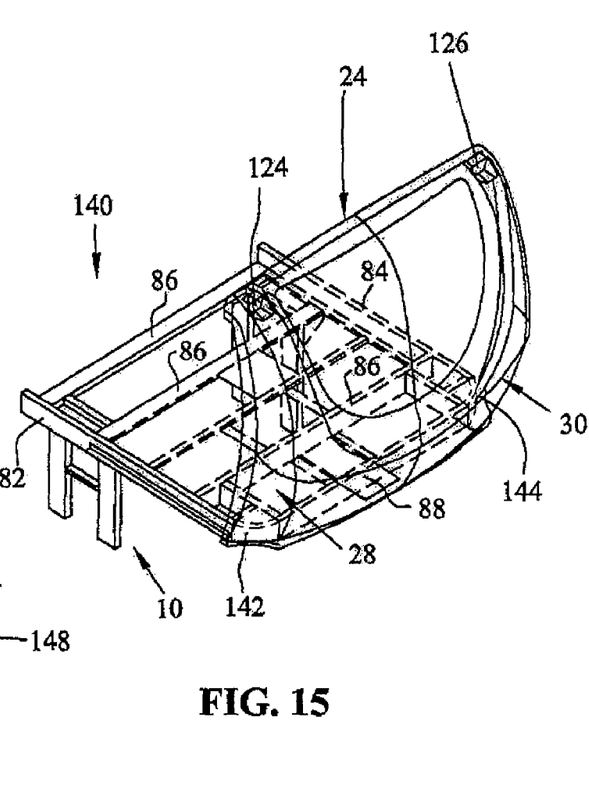
FIG. 15 is a perspective view of the portion of the frame of FIG. 14 including a front cap assembly coupled thereto.

Perspective views of another illustrative embodiment of upper deck 140 of a trailer are shown in FIGS. 14 and 15. As shown in FIG. 14, upper deck 140 is similar in several respects to the prior embodiments, including side frame members 82, 84, as well as cross beams 86 extending there across. The distinction from the previous embodiments is arcuate braces 142, 144. As shown, cross beams 116 and 120 still serve as structural supports adjacent the forward corners. Arcuate braces 142, 144, however, serve as the outer frame members at the forward corners, each attached to their respective frame members 82, 84, and both attached to forward edge beam 88. The forward corners are still recessed as indicated by reference numerals 146, 148 which depict conventional forward frame corners. (See, also, FIG. 9a.) Similar to the previous embodiments, forward end cap 24 is shown attached to upper deck 140 in FIG. 15. It is, again, appreciated that the recessed corner edges 28, 30 can be of any useful depth and may be configured to conform to the shape of the cavities created by arcuate braces 142, 144. Conversely, as shown herein, recessed corner edges 28, 30 may also take a differing recess shape than the cavities formed by cross beams 116, 120.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A fifth wheel trailer comprising:
 a chassis including:
 a forward edge beam having a first end;
 an outer side frame member substantially perpendicular to the forward edge beam, the outer side frame member having a forward end;
 a first cross beam substantially perpendicular to the side frame member and connected to the forward end of the side frame member at a location rearward of the forward edge beam;
 a second cross beam substantially parallel to the outer side frame member and connected to the first cross beam and the first end of the forward edge beam; and
 a brace having a first end connected to the first end of the forward edge beam and a second end connected to the forward end of the outer side frame member.

2. The fifth wheel trailer according to claim 1, wherein the brace is straight.

3. The fifth wheel trailer according to claim 2, wherein the brace forms an angle of greater than 90 degrees between itself and the forward edge beam.

4. The fifth wheel trailer according to claim 2, where in the brace forms an angle of greater than 90 degrees between itself and the outer side frame member.

5. The fifth wheel trailer according to claim 1, wherein the brace is arcuate.

6. The fifth wheel trailer of claim 1, wherein the chassis further includes a third cross beam substantially perpendicular to the side frame member and connected to the side frame member at a location rearward of the first cross beam.

7. The fifth wheel trailer of claim 6, wherein the chassis further includes a fourth cross beam substantially perpendicular to the side frame member and connected to the side frame member at a location rearward of the third cross beam.

8. The fifth wheel trailer of claim 1, wherein the chassis further includes a third cross beam substantially parallel to the outer side frame member and connected to the forward edge beam.

9. The fifth wheel trailer of claim 1, wherein the chassis further includes a second outer side frame member substantially perpendicular to the forward edge beam, the second outer side frame member having a forward end.

10. The fifth wheel trailer of claim 9, wherein the chassis further includes a second brace having a first end connected to the a second end of the forward edge beam and a second end connected to the forward end of the second outer side frame member.

11. The fifth wheel trailer of claim 10, wherein the brace and the second brace are substantially symmetrically positioned relative to a center of the forward edge beam.

12. The fifth wheel trailer of claim 9, wherein the chassis further includes a third cross beam substantially perpendicular to the outer side frame members and connected to the outer side frame members at a location rearward of the first cross beam, the third cross beam having one end connected to the outer side frame member and another end connected to the second outer side frame member.

13. The wheel trailer of claim 1, wherein the brace substantially bisects an area defined by the first cross beam and the second cross beam.

14. The fifth wheel trailer of claim 1, wherein the brace, the first cross beam and the second cross beam form a right triangle, the brace forming an hypotenuse of the right triangle.

15. The fifth wheel trailer of claim 1, wherein the first end of the forward edge beam has an outer surface and the second cross beam has an outer surface, the forward edge beam outer surface lying in a plane that include the second cross beam outer surface.

16. The fifth wheel trailer of claim 1, wherein the forward edge beam, the outer side frame member, the first cross beam, the second cross beam and the brace are part of an upper deck frame having a rearward end opposite the forward edge beam, the first cross beam being spaced apart from the rearward end by a distance that equals an overall length of the side frame member.

17. A fifth wheel trailer comprising:
a chassis including:
a forward edge beam having a first end with a terminus;
an outer side frame member substantially perpendicular to the forward edge beam, the outer side frame member having a forward end with a terminus;
a first cross beam substantially perpendicular to the side frame member and connected to the terminus of the side frame member at a location rearward of the forward edge beam; and
a second cross beam substantially parallel to the outer side frame member and connected to the first cross beam and the terminus of the forward edge beam.

18. The fifth wheel trailer of claim 16, wherein the chassis further includes a brace having a first end connected to the first end of the forward edge beam and a second end connected to the forward end of the outer side frame member.

* * * * *